United States Patent
Suzuki et al.

(10) Patent No.: US 10,104,253 B2
(45) Date of Patent: Oct. 16, 2018

(54) INFORMATION PROCESSING APPARATUS, IMAGE FORMING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Tatsuro Suzuki, Yokohama (JP); Kenichi Hagino, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/202,648

(22) Filed: Jul. 6, 2016

(65) Prior Publication Data

US 2017/0272596 A1    Sep. 21, 2017

(30) Foreign Application Priority Data

Mar. 18, 2016  (JP) ................................. 2016-055525

(51) Int. Cl.
*H04N 1/00* (2006.01)
*G06K 15/00* (2006.01)
(Continued)

(52) U.S. Cl.
CPC ....... *H04N 1/00875* (2013.01); *G06F 3/1222* (2013.01); *G06F 3/1238* (2013.01);
(Continued)

(58) Field of Classification Search
CPC ........... H04N 1/00875; H04N 1/00307; H04N 1/2376; H04N 2201/0094; G06F 3/1222;
(Continued)

(56) References Cited

U.S. PATENT DOCUMENTS

| 9,164,712 | B2 | 10/2015 | Kaigawa | |
| 2015/0092225 | A1* | 4/2015 | Kaigawa | ............... G06F 3/1238 358/1.14 |

(Continued)

FOREIGN PATENT DOCUMENTS

JP        2015-069458 A     4/2015

OTHER PUBLICATIONS

Jul. 28, 2017 Search Report issued in European Patent Application No. 16182311.7.

*Primary Examiner* — Iriana Cruz
(74) *Attorney, Agent, or Firm* — Oliff PLC

(57) ABSTRACT

An information processing apparatus includes a receiving unit that receives print instruction information; an authenticating unit that performs an authentication for permitting a printing process; an execution unit that executes the printing process when the authentication succeeds; a near field communication unit; a wireless communication unit that performs wireless communication that differs in a communication protocol from the near field communication; a transmitting unit that transmits identification information of the information processing apparatus to a terminal device when a connection via the near field communication is established in response to an operation of passing the terminal device over the near field communication unit; and a control unit that, when the receiving unit receives the print instruction information via the wireless communication using the identification information as a transmission destination, temporarily disables a function of the authenticating unit, and causes the execution unit to execute the printing process.

8 Claims, 3 Drawing Sheets

(51) Int. Cl.
  *H04N 1/23* (2006.01)
  *G06F 3/12* (2006.01)
  *H04W 4/00* (2018.01)
  *H04W 76/10* (2018.01)
  *H04W 4/80* (2018.01)
  *H04B 5/00* (2006.01)
  *H04W 84/12* (2009.01)

(52) U.S. Cl.
  CPC .......... *G06F 3/1284* (2013.01); *G06F 3/1292* (2013.01); *G06F 3/1293* (2013.01); *G06K 15/4095* (2013.01); *H04B 5/0056* (2013.01); *H04N 1/00307* (2013.01); *H04N 1/2376* (2013.01); *H04W 4/80* (2018.02); *H04W 76/10* (2018.02); *H04N 2201/0094* (2013.01); *H04W 84/12* (2013.01)

(58) Field of Classification Search
  CPC .... G06F 3/1238; G06F 3/1284; G06F 3/1293; G06K 15/4095; H04W 4/008; H04W 76/02; H04W 84/12
  See application file for complete search history.

(56) References Cited

U.S. PATENT DOCUMENTS

2015/0254919 A1* 9/2015 Cok ................. G07D 7/122
  356/388
2015/0277823 A1* 10/2015 Nakayama ......... G03G 15/5087
  358/1.14

* cited by examiner

INFORMATION PROCESSING APPARATUS, IMAGE FORMING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under USC 119 from Japanese Patent Application No. 2016-055525, filed on Mar. 18, 2016.

BACKGROUND

Technical Field

The present invention relates to an information processing apparatus, an image forming apparatus, an information processing method, and a non-transitory computer readable medium.

SUMMARY

According to an aspect of the invention, there is provided an information processing apparatus, including: a receiving unit that receives print instruction information to print data; an authenticating unit that performs an authentication for permitting a printing process according to the print instruction information; an execution unit that executes the printing process according to the print instruction information when the authentication succeeds; a near field communication unit that performs near field communication; a wireless communication unit that performs wireless communication that differs in a communication protocol from the near field communication; a transmitting unit that transmits identification information of the information processing apparatus to a terminal device when a connection via the near field communication is established in response to an operation of passing the terminal device over the near field communication unit; and a control unit that, when the receiving unit receives the print instruction information via the wireless communication using the identification information of the information processing apparatus as a transmission destination or the near field communication through the operation of passing the terminal device, temporarily disables a function of the authenticating unit, and causes the execution unit to execute the printing process according to the print instruction information.

BRIEF DESCRIPTION OF DRAWINGS

Exemplary embodiment(s) of the present invention will be described in detail based on the following figures, wherein.

DETAILED DESCRIPTION

Figure 1:
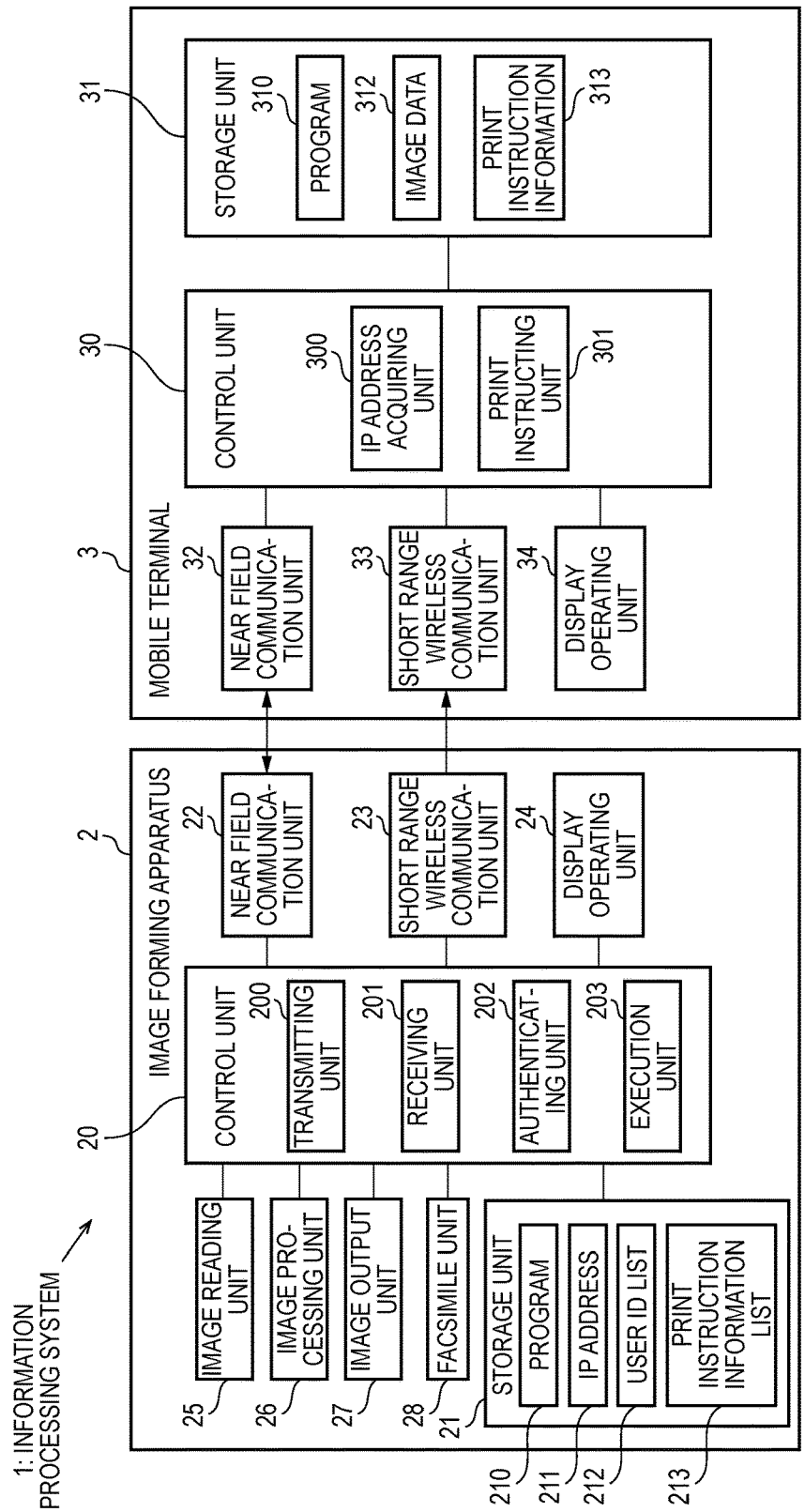
FIG. 1 is a block diagram functionally illustrating an exemplary configuration of an information processing system according to an exemplary embodiment of the present invention.

Hereinafter, an exemplary embodiment of the present invention will be described with reference to the appended drawings. In the drawings, components having substantially the same function are denoted by the same reference numerals, and a duplicated description will be omitted. In the exemplary embodiment, an image processing apparatus will be described as an exemplary information processing apparatus, but the information processing apparatus may be any other information processing apparatus.

FIG. 1 is a block diagram functionally illustrating an exemplary configuration of an information processing system according to an exemplary embodiment of the present invention. An information processing system 1 is configured such that an image forming apparatus 2 and a mobile terminal 3 are connected so that wireless communication can be performed therebetween.

(Configuration of Image Forming Apparatus)

The image forming apparatus 2 is a multifunction device having plural functions such as a copy function, a scanning function, a printing function, and a facsimile function, and includes a control unit 20 that controls respective units of the image forming apparatus 2. A storage unit 21, a near field communication unit 22, a short range wireless communication unit 23, a display operating unit 24, an image reading unit 25, an image processing unit 26, an image output unit 27, and a facsimile unit 28 are connected to the control unit 20.

The near field communication unit 22 performs near field communication in which a communicable distance is, for example, about 10 cm or less with a near field communication unit 32 of the mobile terminal 3. As such communication, in the exemplary embodiment, for example, NFC communication in which the P2P mode is possible is used.

The storage unit 21 is implemented by a read only memory (ROM), a random access memory (RAM), a hard disk, or the like, and stores a program 210, an IP address 211 allocated to its own apparatus, a user ID list 212, a print instruction information list 213, and the like. The program 210 is an exemplary information processing program. Here, the IP address 211 is exemplary identification information of the image forming apparatus.

A user ID accessible to the image forming apparatus 2 is registered in the user ID list 212 in advance. Here, the user ID is exemplary identification information of the user. When the mobile terminal 3 uses an individual identification number, the user ID and the individual identification number are included in the user ID list 212. One or more pieces of print instruction information are stored in the print instruction information list 213. The storage unit 21 may not store the user ID list 212. In this case, for example, a server stores the user ID list 212, and the image forming apparatus 2 transmits a user authentication request to the server via a network.

When the near field communication unit 22 and a near field communication unit 32 belonging to the other party are within the communicable distance, for example, when a distance between their antennas is about 10 cm or less, a connection via the near field communication is established. Further, in a state the near field communication unit 22 and the near field communication unit 32 belonging to the other party are within the communicable distance, and thus the connection is established, when the near field communication unit 32 belonging to the other party deviates from the communicable distance, the connection via the near field communication is cut.

The short range wireless communication unit 23 performs short range wireless communication with a short range wireless communication unit 33 of the mobile terminal 3 within a communicable distance larger than that of the near field communication unit 22, for example, a distance of about 100 m or less. As such communication, for example, a wireless local area network (LAN) with intervention of a LAN router such as a wireless fidelity (Wi-Fi) or wireless communication with no intervention of a LAN router such as Wi-Fi Direct or Bluetooth (a registered trademark) may be used. For the short range wireless communication unit 23, a communication protocol different from that of the near field communication unit 22 is used.

The display operating unit 24 includes a touch panel display in which a touch panel is superimposed on a display unit such as a liquid crystal display, and causes an operation screen to be displayed on the display unit and receives an operation on the touch panel from an operator.

The image reading unit 25 is configured, for example, with a scanner, and reads and receives image data from an original. The image processing unit 26 performs image processing such as compression, decompression, and synthesis on the image data input from the image reading unit 25 or the like. The image output unit 27 includes, for example, an image holding member by a photoconductor, forms an image on a recording medium such as a sheet, and outputs the resulting medium. The facsimile unit 28 performs modulation and demodulation on data according to a facsimile protocol such as G3 or G4, and performs facsimile communication through a telephone line.

The control unit 20 is configured with a central processing unit (CPU), an interface, and the like. The CPU operates according to the program 210 stored in the storage unit 21 and thus functions as a transmitting unit 200, a receiving unit 201, an authenticating unit 202, an execution unit 203, and the like and executes the P2P mode.

When the near field communication unit 22 establishes the connection via the near field communication with the near field communication unit 32 of the mobile terminal 3, the transmitting unit 200 reads the IP address 211 from the storage unit 21, and transmits the IP address 211 to the mobile terminal 3 through the near field communication unit 22.

The receiving unit 201 receives the print instruction information to print data. The receiving unit 201 may receive the print instruction information transmitted from a terminal device (not illustrated) via a network (which may be short range wireless communication). The receiving unit 201 may further receive print instruction information 313 through the short range wireless communication unit 23 through the operation of passing the mobile terminal 3 over the image forming apparatus 2. In the former case, the receiving unit 201 registers the received print instruction information in the print instruction information list 213. In the latter case, the transmitting unit 200 transfers the received print instruction information 313 to the execution unit 203.

The authenticating unit 202 performs an authentication process for permitting printing according to the print instruction information 313 stored as the print instruction information list 213 of the storage unit 21. Specifically, the authenticating unit 202 performs the user authentication process based on the user ID received by an operation on the display operating unit 24, that is, determines whether or not the received user ID is registered in the user ID list 212 of the storage unit 21, and proceeds to a next process when the user ID is registered in the user ID list 212 of the storage unit 21, that is, when the authentication succeeds. The authenticating unit 202 notifies the execution unit 203 of the authentication result. The authenticating unit 202 may authenticate the user based on the user ID and the password.

The execution unit 203 performs the printing process according to the print instruction information 313 transferred from the receiving unit 201. In other words, the execution unit 203 controls the image output unit 27 such that image data is printed under a printing condition set according to the print instruction information 313. The image output unit 27 prints image data on a recording medium such as a sheet under the printing condition set according to the print instruction information 313. The execution unit 203 may control the image processing unit 26 or the facsimile unit 28 such that a process is performed depending on instruction information transferred from the receiving unit 201.

When the print instruction information selected by the operation on the display operating unit 24 among the print instruction information included in the print instruction information list 213 is printed, the execution unit 203 performs the printing process when the authentication succeeds, but rejects the printing process when the authentication does not succeed.

For example, when the operation of passing the mobile terminal 3 is performed once, and the receiving unit 201 receives the print instruction information 313 via the short range wireless communication using its own IP address as the transmission destination, the control unit 20 temporarily disables the function of the authenticating unit 202, and causes the execution unit 203 to perform the printing process according to the print instruction information 313. The execution unit 203 performs the printing process according to the print instruction information 313 regardless of whether or not the authentication succeeds.

Some or all of the transmitting unit 200, the receiving unit 201, the authenticating unit 202, and the execution unit 203 may be configured with a hardware circuit such as a field programmable gate array (FPGA) or an application specific integrated circuit (ASIC).

(Configuration of Mobile Terminal)

The mobile terminal 3 includes a control unit 30 that controls respective units of the mobile terminal 3. A storage unit 31, the near field communication unit 32, the short range wireless communication unit 33, and a display operating unit 34 are connected to the control unit 30. The mobile terminal 3 may be a personal computer, a tablet type computer, a multi-functional telephone (smart phone), a mobile phone, or the like.

The storage unit 31 is implemented by a ROM, a RAM, a hard disk, or the like, and stores a program 310, image data 312, the print instruction information 313, and the like.

The near field communication unit 32 performs the near field communication with the near field communication unit 22 of the image forming apparatus 2, and has the same function as the near field communication unit 22 of the image forming apparatus 2.

The short range wireless communication unit 33 performs the short range wireless communication with the short range wireless communication unit 23 of the image forming apparatus 2, and has the same function as the short range wireless communication unit 23 of the image forming apparatus 2.

The display operating unit 34 includes a touch panel display in which a touch panel is superimposed on a display unit such as a liquid crystal display, and causes an operation screen to be displayed on the display unit and receives an operation on the touch panel from an operator.

The control unit 30 is configured with a CPU, an interface, and the like. The CPU operates according to a program 310 stored in the storage unit 31 and thus functions as an IP address acquiring unit 300, a print instructing unit 301, a transmitting unit 302, and the like, and executes the P2P mode.

When the near field communication unit 32 establishes the connection via the near field communication with the near field communication unit 22 of the image forming apparatus 2, the IP address acquiring unit 300 acquires the IP address 211 of the image forming apparatus 2 through the near field communication unit 32. The IP address acquiring unit 300 notifies the print instructing unit 301 of the acquired IP address 211.

The print instructing unit 301 transmits the print instruction information 313 to instruct printing of data to the image forming apparatus 2 of the corresponding IP address 211 through the short range wireless communication unit 33 using the IP address as the transmission destination.

Some or all of the IP address acquiring unit 300 and the print instructing unit 301 may be configured with a hardware circuit such as an FPGA or an ASIC. The IP address acquiring unit 300 may be executed by an operating system (OS), and the print instructing unit 301 may be executed by application software.

(Operation of Information Processing System)

Figure 2:
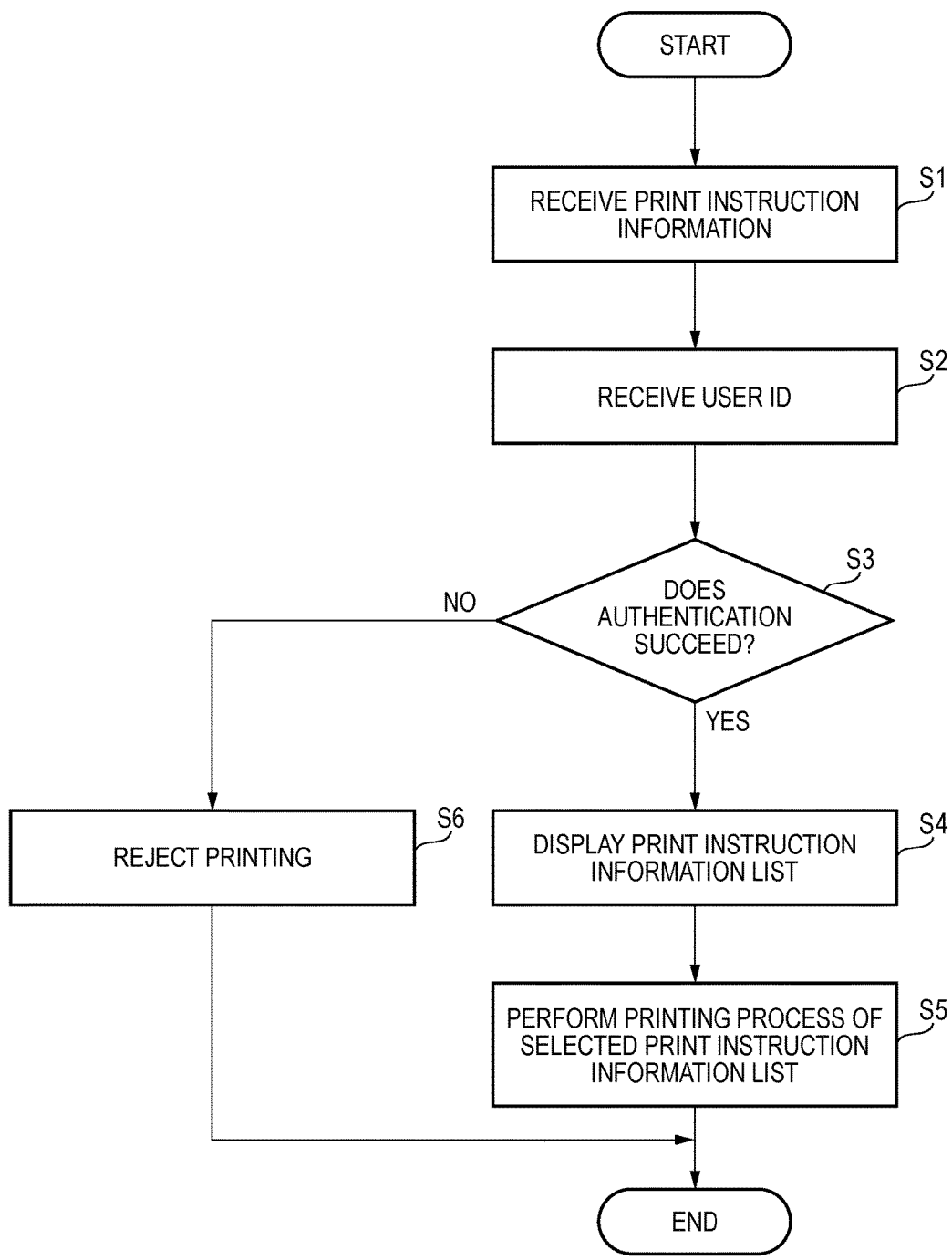
FIG. 2 is a flowchart illustrating an exemplary operation of an image forming apparatus in a case where an authentication is performed.
Figure 3:
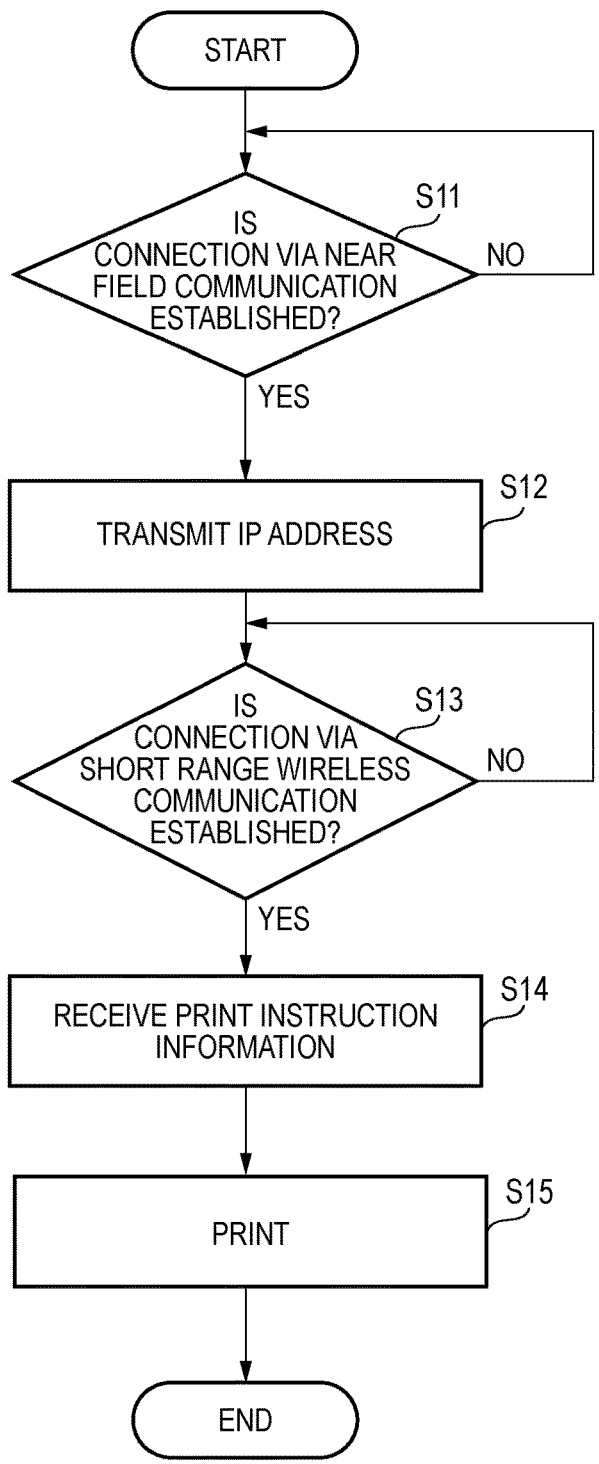
FIG. 3 is a flowchart illustrating an exemplary operation of an image forming apparatus in a case where an authentication is omitted.

Next, an exemplary operation of the information processing system 1 will be described with reference to FIGS. 2 and 3. FIG. 2 is a flowchart illustrating an exemplary operation of the image forming apparatus 2 in a case where the authentication is performed. FIG. 3 is a flowchart illustrating an exemplary operation of the image forming apparatus 2 in a case where the authentication is omitted.

(1) In a Case where the Authentication is Performed

First, the user operates the terminal device (not illustrated) to select image data of a file to be printed, set the printing condition for the selected image data such as a color/monochrome and the number of sheets to be printed, and generate the print instruction information. The user operates the terminal device to transmit the print instruction information to the image forming apparatus 2 via the network.

Upon receiving the print instruction information via the network (S1), the receiving unit 201 of the image forming apparatus 2 causes the received print instruction information to be stored in the print instruction information list 213 in the storage unit 21.

When the user ID is input from the display operating unit 24 (S2), the authenticating unit 202 determines whether or not the user ID is registered in the user ID list 212 (S3). The authenticating unit 202 notifies the execution unit 203 of the authentication result.

When the authentication succeeds (Yes in S3), the execution unit 203 causes the print instruction information list 213 stored in the storage unit 21 to be displayed on the display operating unit 24 (S4). The user operates the display operating unit 24 to select the print instruction information that is desired to be printed. The execution unit 203 controls the image output unit 27 such that the printing process is performed according to the selected print instruction information (S5).

When the authentication does not succeed (No in S3), the execution unit 203 rejects the printing process (S6).

(2) In a Case where the Authentication is Omitted

First, the user operates the display operating unit 34 of the mobile terminal 3 to display the print setting screen. Then, the user operates the print setting screen to select the image data 312 of a file to be printed from the image data 312 stored in the storage unit 31.

Then, the user sets the printing condition for the selected image data 312 such as a color/monochrome and the number of sheets to be printed. The print instructing unit 301 generates the print instruction information 313 for giving an instruction to print the selected image data 312 under the set printing condition, and stores the print instruction information 313 in the storage unit 31. For example, by displaying the selected image data on the display operating unit 34, the print instructing unit 301 causes the mobile terminal 3 to enter a standby state for the near field communication and enables the P2P mode to be executable. The way to cause the mobile terminal to enter the standby state for the near field communication is not limited to that to display the selected image data on the display operating unit 34, but is preferably in the state where the image data is selected, and the printing condition is set.

The near field communication unit 22 of the image forming apparatus 2 transmits a wireless signal at regular intervals and determines the presence or absence of a communication target. When the near field communication unit 32 of the mobile terminal 3 is brought close to (passed over) the near field communication unit 22 of the image forming apparatus 2 in a state where the image data selected by the user is displayed on the display operating unit 34, the near field communication unit 22 of the image forming apparatus 2 continuously detects the mobile terminal 3 twice or more, and establishes the connection via the near field communication with the near field communication unit 32 of the mobile terminal 3.

When the near field communication unit 22 establishes the connection via the near field communication with the near field communication unit 32 of the mobile terminal 3 (Yes in S11), the transmitting unit 200 reads the IP address 211 from the storage unit 21, and transmits the IP address 211 to the mobile terminal 3 through the near field communication unit 22 (S12).

Upon receiving the IP address 211 transmitted from the image forming apparatus 2 through the near field communication unit 32, the IP address acquiring unit 300 of the mobile terminal 3 notifies the print instructing unit 301 of the acquired IP address 211.

The print instructing unit 301 performs controls such that the print instruction information 313 is transmitted from the short range wireless communication unit 33 to the image forming apparatus 2 using the notified IP address 211 as a transmission destination. When the short range wireless communication unit 33 establishes the connection via the short range wireless communication with the short range wireless communication unit 23 (S13), the receiving unit 201 of the image forming apparatus 2 receives the print instruction information 313 via the short range wireless communication (S14). The receiving unit 201 transfers the received print instruction information 313 to the execution unit 203. The control unit 20 temporarily disables the function of the authenticating unit 202, and causes the execution unit 203 to execute the printing process according to the print instruction information 313. Since the function of the authenticating unit 202 is disabled, the execution unit 203 controls the image output unit 27 such that the image data is printed on the recording medium under the printing condition set according to the print instruction information 313 regardless of the authentication result (S15).

The exemplary embodiment of the present invention has been described above, but the present invention is not limited to the exemplary embodiment, and various modifications can be made within the scope not departing from the gist of the present invention.

First Modified Example

The control unit 20 may enables the function of the authenticating unit 202 when the connection via the near field communication is not established for a predetermined period of time after the printing process ends.

Second Modified Example

The control unit 20 may temporarily disable the function of the authenticating unit 202 for causing the execution unit 203 to perform the printing process, and enable the function of the authenticating unit 202 after the printing process ends.

Third Modified Example

The control unit 20 may have a function as a setting unit capable of performing setting as to whether the function of the authenticating unit 202 is enabled or disabled.

Fourth Modified Example

In the exemplary embodiment described above, the print instruction information 313 is transmitted through the short range wireless communication unit 33 since high-speed communication can be performed. However, for example, in a case where an amount of data is small, the print instruction information 313 may be transmitted through the near field communication unit 32.

Fifth Modified Example

In the exemplary embodiment described above, image data has been described as a file to be printed. However data that can be dealt with by the mobile terminal 3 such as a text, a PDF, or a web page may be set as a file to be printed.

Further, in the flow of the exemplary embodiment, for example, a step may be added, deleted, changed, or exchanged within the scope not departing from the gist of the present invention.

Moreover, the program used in the exemplary embodiment may be recorded in a non-transitory computer readable recording medium such as a CD-ROM and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
   a near field communication interface that performs near field communication;
   a wireless communication interface that performs wireless communication that differs in a communication protocol from the near field communication; and
   a processor programed to:
   receive print instruction information to print data;
   perform an authentication for permitting a printing process according to the print instruction information;
   execute the printing process according to the print instruction information when the authentication succeeds;
   transmit identification information of the information processing apparatus to a terminal device when a connection via the near field communication is established in response to an operation of passing the terminal device over the near field communication interface; and
   wherein upon receipt of the print instruction information via the wireless communication interface,
      the processor uses the identification information of the information processing apparatus as a transmission destination or the near field communication through the operation of passing the terminal device, and
      the processor temporarily disables the authentication for permitting a printing process, executes the printing process according to the print instruction information, and enables the authentication for permitting a printing process after the printing process ends,
   wherein when the print instruction is received through an operation other than passing the terminal device, the processor causes the authentication for permitting a printing process.

2. The information processing apparatus according to claim 1,
   wherein the processor enables authentication when the connection via the near field communication is not established for a predetermined period or longer after the printing process ends.

3. The information processing apparatus according to claim 1, wherein,
   the processor is capable of performing a setting as to whether authentication is enabled or disabled.

4. An image forming apparatus, comprising:
   a near field communication interface that performs near field communication;
   a wireless communication interface that performs wireless communication that differs in a communication protocol from the near field communication; and
   a processor programed to:
   receive print instruction information to print data;
   perform an authentication for permitting a printing process according to the print instruction information;
   execute the printing process according to the print instruction information when the authentication succeeds;
   transmit identification information of the image forming apparatus to a terminal device when a connection via the near field communication is established in response to an operation of passing the terminal device over the near field communication interface; and
   wherein upon receipt of the print instruction information via the wireless communication interface,
      the processor uses the identification information of the image forming apparatus as a transmission destination or the near field communication through the operation of passing the terminal device, and the processor temporarily disables the authentication for permitting a printing process, executes the printing process according to the print instruction information, and enables the authentication for permitting a printing process after the printing process ends, wherein when the print instruction is received through an operation other than passing the terminal device, the processor causes the authentication for permitting a printing process.

5. The image forming apparatus according to claim 4, wherein the processor enables authentication when the connection via the near field communication is not established for a predetermined period or longer after the printing process ends.

6. The image forming apparatus according to claim 4, wherein, the processor is capable of performing a setting as to whether authentication is enabled or disabled.

7. An information processing method comprising:
receiving print instruction information to print data;
authenticating for permitting a printing process according to the print instruction information;
executing the printing process according to the print instruction information when the authenticating succeeds;
transmitting own identification information to a terminal device when a connection via near field communication is established in response to an operation of passing the terminal device; and
temporarily disabling a function of the authenticating, when receiving the print instruction information via wireless communication using the own identification information as a transmission destination or the near field communication through the operation of passing the terminal device, the wireless communication differing in a communication protocol from the near field communication, for executing the printing process according to the print instruction information, executing the printing process according to the print instruction information, and enabling the authentication for permitting a printing process after the printing process ends, wherein when the print instruction is received through an operation other than passing the terminal device, causing the authentication for permitting a printing process.

8. A non-transitory computer readable medium storing a program causing a computer to:
receive print instruction information to print data;
perform an authentication for permitting printing process according to the print instruction information;
execute the printing process according to the print instruction information when the authentication succeeds;
transmit identification information of the computer to a terminal device when a connection via near field communication is established in response to an operation of passing the terminal device over the computer; and
upon receipt of the print instruction information via wireless communication, use the identification information of the computer as a transmission destination or the near field communication through the operation of passing the terminal device, the wireless communication differing in a communication protocol from the near field communication, temporarily disable the authentication for permitting printing process, cause execution of the printing process according to the print instruction information, and after the printing process ends, enable the authentication for permitting a printing process, wherein when the print instruction is received through an operation other than passing the terminal device, cause the authentication for permitting a printing process.

* * * * *